United States Patent
Kim et al.

(10) Patent No.: US 8,769,994 B2
(45) Date of Patent: Jul. 8, 2014

(54) ANNEALING APPARATUS AND METHOD FOR FLOAT GLASS

(75) Inventors: Woo-Hyun Kim, Dongducheon-si (KR); Sang-Oeb Na, Seoul (KR); Yang-Han Kim, Goyang-si (KR); Kil-Ho Kim, Suwon-si (KR); Heui-Joon Park, Paju-si (KR); Jin Han, Goyang-si (KR); Dong-Shin Shin, Incheon (KR)

(73) Assignee: LG Chem, Ltd., Seoul (KR)

( * ) Notice: Subject to any disclaimer, the term of this patent is extended or adjusted under 35 U.S.C. 154(b) by 296 days.

(21) Appl. No.: 13/149,032

(22) Filed: May 31, 2011

(65) Prior Publication Data

US 2011/0294644 A1    Dec. 1, 2011

(30) Foreign Application Priority Data

May 31, 2010    (KR) .................. 10-2010-0050872

(51) Int. Cl.
*C03B 13/16*    (2006.01)

(52) U.S. Cl.
USPC .............. 65/370.1; 65/118; 65/254; 277/412

(58) Field of Classification Search
USPC ............... 65/370.1, 258, 253, 254, 193, 194, 65/182.1, 182.2, 111, 117, 118, 119, 95; 277/512, 514, 515, 408, 411–421
See application file for complete search history.

(56) References Cited

U.S. PATENT DOCUMENTS

| | | | | |
|---|---|---|---|---|
| 1,744,377 A | * | 1/1930 | Ferngren | 65/118 |
| 2,588,122 A | * | 3/1952 | Jones | 48/194 |
| 3,754,880 A | * | 8/1973 | Henderson et al. | 65/27 |
| 3,994,711 A | * | 11/1976 | McMaster | 65/163 |
| 4,620,864 A | * | 11/1986 | McMaster | 65/114 |
| 4,725,300 A | * | 2/1988 | McMaster | 65/273 |
| 5,085,680 A | * | 2/1992 | Bender et al. | 65/118 |
| 5,772,715 A | * | 6/1998 | McMaster et al. | 65/32.1 |
| 2002/0078714 A1 | * | 6/2002 | Bird et al. | 65/427 |
| 2004/0237591 A1 | * | 12/2004 | Shetterly et al. | 65/111 |

FOREIGN PATENT DOCUMENTS

| | | |
|---|---|---|
| CN | 1854517 A | 11/2006 |
| WO | WO 02/051767 A | 7/2002 |
| WO | 2009/148141 A1 | 12/2009 |
| WO | WO 2009/148141 A | 12/2009 |

\* cited by examiner

*Primary Examiner* — Richard Crispino
*Assistant Examiner* — Yana B Krinker
(74) *Attorney, Agent, or Firm* — Mckenna, Long & Aldridge LLP

(57) ABSTRACT

An annealing apparatus for a float glass continuously anneals a glass ribbon molded in a float bath. The annealing apparatus includes a lehr housing having an inlet and an outlet for the glass ribbon, a plurality of lehr rolls rotatably installed to the lehr housing in a width direction of the lehr housing, and labyrinth seals installed between the lehr rolls and sidewalls of the lehr housing, respectively, to prevent sulfurous acid gas supplied into the lehr housing from discharging out.

2 Claims, 1 Drawing Sheet

ANNEALING APPARATUS AND METHOD FOR FLOAT GLASS

CROSS-REFERENCE TO RELATED APPLICATION

This application claims priority under 35 U.S.C. §119(a) to Korean Patent Application No. 10-2010-0050872 filed at the Korean Intellectual Property Office on May 31, 2010, the entire contents of which are incorporated herein by reference.

BACKGROUND

1. Field

Exemplary embodiments relate to an annealing apparatus and method for a float glass, and more particularly, to an annealing apparatus and method for a float glass in which a sealing structure of lehr rolls of an annealing lehr which anneals a glass ribbon continuously produced by a floating process.

2. Description of the Related Art

Generally, a float glass manufacturing system continuously supplies molten glass onto a molten metal (e.g., a molten tin) stored in a float bath, molds a strip-shaped (or, ribbon-shaped) glass ribbon with consistent width and thickness while carrying the molten glass to float on the molten metal, and pulls the glass ribbon toward an annealing lehr adjacent to the outlet of the float bath to produce a glass plate.

Here, the molten metal may be for example a molten tin or a molten tin alloy and has a greater specific weight than the molten glass. The molten metal is received in a float chamber filled with reducing hydrogen ($H_2$) and/or nitrogen ($N_2$) In addition, the float bath receiving the molten metal is elongated in a length direction and includes special fireproof material. The molten glass moves from an upstream side of the float bath to a downstream side and is molded into a glass ribbon on the surface of the molten metal. Then, at a separating location (hereinafter, referred to as a "take-off point") set at the downstream side of the float bath, the glass ribbon is lifted up away from the molten metal by lift-out rollers installed to a dross box, and the lifted glass ribbon is delivered through the dross box toward an annealing lehr for the next process. Meanwhile, a successive glass ribbon with a predetermined width is cut into several sheets with a predetermined size, which are called "glass sheets".

The gas containing volatile tin and contained in the float bath flows toward the downstream side of the float bath, namely toward the dross box, due to a positive pressure in the float bath. The gas flowing toward the dross box as mentioned above creates inferiorities at the surface of the molten tin or the surface of the glass which is carried after being condensed near the dross box and at a low-temperature region in the float bath at the downstream side (generally, dross is generated at 780° C. or below). In addition, even though the inside of the float bath is kept with a positive pressure, the tin-containing gas mentioned above may flow toward the downstream side of the float bath through the dross box. In this process, oxygen contained in an external air may react with the volatile tin in the float bath at the relatively low-temperature region, and if the gas is condensed in this state, a tin-based floating impurity may be generated at the surface of the tin. In this case, while the ribbon-shaped glass is lifted up by the lift-out rollers and drawn out of the float bath, the tin-based floating impurity adhered to the surface of the molten tin is moved and drawn together with the bottom surface of the glass ribbon. This tin-based floating impurity may contaminate the dross box and the surface of rollers used in the annealing process. In addition, in a case where the glass moves by the float bath or is annealed, the tin-based floating impurity may be a potential factor of an impurity forming at the bottom surface. Therefore, the tin-based floating impurity may deteriorate the safety of the annealing work and deteriorate the process stability and the quality of the glass products.

In addition, in the conventional float glass manufacturing apparatus, sulfurous acid gas is supplied into the annealing lehr. The sulfurous acid gas reduces the friction between the bottom of the glass ribbon and the lehr rolls to prevent any defect of a glass product. However, since the space between the lehr rolls and a casing of the annealing lehr to which the lehr rolls are installed is very wide, the sulfurous acid gas may leak to the space and give harm to the human body.

SUMMARY

The exemplary embodiments are designed to solve the problems of the prior art, and therefore the exemplary embodiments are directed to providing an annealing apparatus and method for a float glass in which a sealing structure of a lehr housing of an annealing lehr is improved.

In one aspect, the exemplary embodiment provides an annealing apparatus for a float glass, which continuously anneals a glass ribbon molded in a float bath, the annealing apparatus including: a lehr housing having an inlet and an outlet for the glass ribbon; a plurality of lehr rolls rotatably installed to the lehr housing in a width direction of the lehr housing; and labyrinth seals installed between the lehr rolls and sidewalls of the lehr housing, respectively, to prevent sulfurous acid gas supplied into the lehr housing from discharging out.

The annealing apparatus may further include collecting nozzles installed to the labyrinth seals for collecting sulfurous acid gas discharged through the labyrinth seals.

In another aspect, the exemplary embodiment provides an annealing method for a float glass, which continuously anneals a glass ribbon, molded in a float bath, in a lehr housing to which lehr rolls are installed, the annealing method including: supplying sulfurous acid gas into the lehr housing to reduce a friction between a bottom of the glass ribbon and lehr rollers and to reduce a defect occurring at a surface of the glass ribbon; and sealing gaps between the lehr housing and the lehr rolls by means of labyrinth seals installed at outer peripheries of the lehr rolls so that the sulfurous acid gas supplied into the lehr housing is not discharged through the gaps.

The annealing method may further include collecting the sulfurous acid gas sealed by the labyrinth seals.

The annealing apparatus and method for a float glass according to the exemplary embodiment applies labyrinth seals between the lehr rollers and the casing to construct a configuration for collecting a leaking gas so that the sulfurous acid gas in the lehr casing does not substantially leak to a work place, thereby decreasing an absolute amount of sulfurous acid gas used and preventing environmental pollutions.

BRIEF DESCRIPTION OF THE DRAWINGS

Other objects and aspects of the present invention will become apparent from the following descriptions of the embodiments with reference to the accompanying drawings in which.

DESCRIPTION OF THE PREFERRED EMBODIMENT

Hereinafter, an annealing apparatus and method for a float glass according to exemplary embodiments will be described in detail with reference to the accompanying drawings.

Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
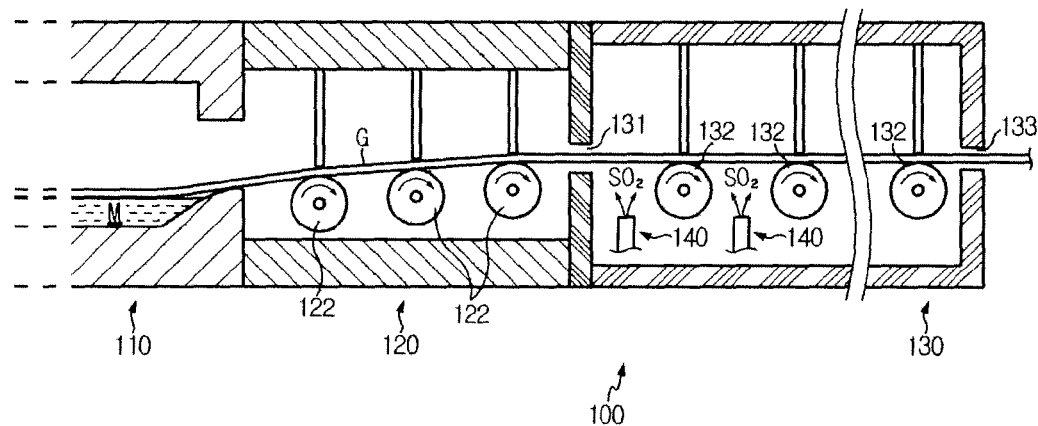
FIG. 1 is a side view schematically showing an annealing apparatus for a float glass according to an exemplary embodiment.
Figure 2:
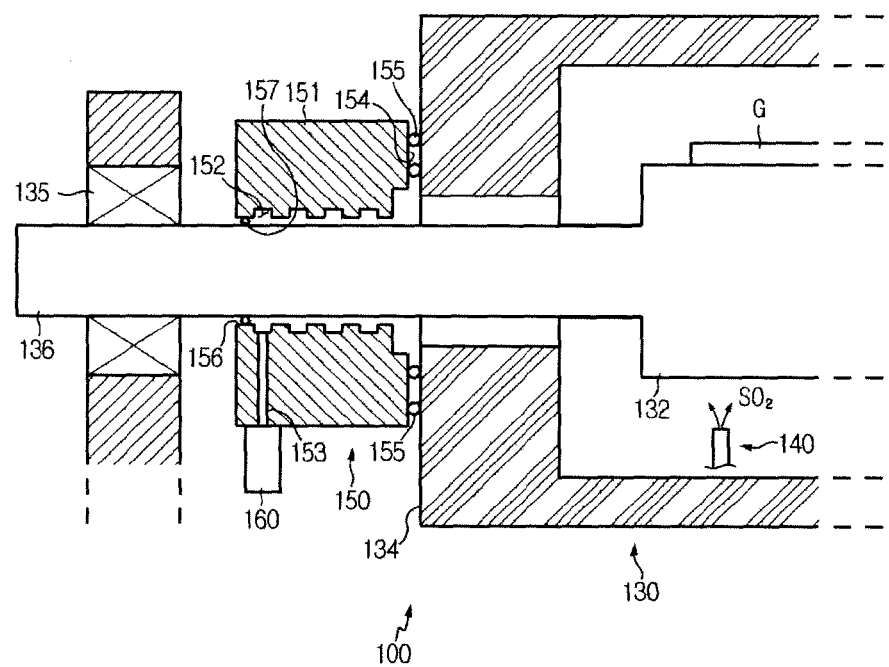
FIG. 2 is a sectional view schematically showing the annealing apparatus for a float glass of FIG. 1.

FIG. 1 is a side view schematically showing an annealing apparatus for a float glass according to an exemplary embodiment, and FIG. 2 is a sectional view schematically showing the annealing apparatus for a float glass of FIG. 1.

Referring to FIGS. 1 and 2, an annealing apparatus 100 for a float glass according to this embodiment includes a lehr housing 130 which is installed adjacent to a dross box 120 for drawing a glass ribbon G molded by a float bath 110. A plurality of lehr rollers 132 are installed to the lehr housing 130.

The float bath 110 stores molten metal M such as molten tin, molten tin alloy, or the like. The molten metal M is supplied from an upstream side (a left portion in the figures) of the float bath 110 and moves to a downstream side (a right portion in the figures). In this process, a glass ribbon is molded. In addition, the molten metal M floats from the upstream side of the float bath 110, which is kept at a relatively high temperature due to the temperature gradient in the float bath 110, to the downstream side and also floats from the center of the float bath 110 to both sides thereof. The molten glass G moves from the upstream side to the downstream side. After that, at a take-off point TO, the molten glass G is pulled toward the ceiling of a float chamber away from the bath surface of the molten metal M and is also drawn toward the dross box 120 for the next process.

The float bath 110 is composed of a mixed gas of nitrogen and oxygen. The mixed gas is kept at a pressure slightly higher than the atmospheric pressure. The molten metal M and the ribbon-shaped molten glass G are kept at about 800 to 1,300° C. by an electric heater (not shown). The molten glass G is a non-alkali glass, a soda lime glass, or the like. The principle or structure of generating a flow of the molten metal M in the float bath 110 and the process of putting, molding into a ribbon shape, moving or discharging the molten glass G are already well known in the art as a floating process, and they are not described in detail here.

The dross box 120 is disposed adjacent to the downstream end of the float bath 110. The dross box 120 has three lift-out rollers 122 arranged therein. The lift-out rollers 122 lift the molten glass G, which is supplied from the upstream side of the float bath 110 and moved onto the surface of the molten metal M toward the downstream side of the float bath 110, at a separating location set at the downstream side from the molten metal so that the molten glass G is supplied to the lehr housing 130 disposed at the outlet of the dross box 120. The lift-out rollers 122 respectively rotate at a predetermined speed by a motor (not shown) and are spaced apart from each other at different horizontal locations so that the molten glass G may be easily drawn.

The lehr housing 130 anneals the glass ribbon G molded in the float bath 110 which is continuously supplied from the float bath 110. The lehr housing 130 has an inlet 131 through which the glass ribbon G is supplied and an outlet 133 through which the annealed glass ribbon G is discharged. The inside of the lehr housing 130 is sealed. The plurality of lehr rollers 132 are installed in a width direction of the lehr housing 130. In addition, sulfurous acid gas is filled in the lehr housing 130 through a sulfurous acid gas supply member 140 which may be a type of pipe or hose. A rotary shaft 136 of each lehr roller 132 is formed through sidewalls 134 of the lehr housing 130 so that both ends of the rotary shaft 136 may rotate while being supported on a frame (not shown) by bearings 135. Here, the lehr roller 132 may rotate by a driving source such as a motor, not shown.

A labyrinth seal 150 is installed between the sidewall 134 of the lehr housing 130 and the rotary shaft 136 of the lehr roller 132. The labyrinth seal 150 prevents the sulfurous acid gas supplied into the lehr housing 130 from discharging out of the lehr housing 130. The labyrinth seal 150 extends the fluid moving path in an elaborate and complicated pattern to prevent the fluid from directly leaking. In this embodiment, a labyrinth-type channel 152 having an uneven structure and arranged in parallel with the rotary shaft 136 of the lehr roller 132 is used as the labyrinth seal 150. The labyrinth seal 150 has a first surface 154 adjacent to the sidewall 134 of the lehr housing 130, and a first O-ring 155 may be installed to the first surface 154. The labyrinth seal 150 also has a second surface 156 which faces the rotary shaft 136 of the lehr roller 132, and a second O-ring 157 may be installed to the second surface 156. Meanwhile, the lehr housing 130 means an "annealing lehr" used in a general float process, unless otherwise noted.

In a modified embodiment, the channel 152 formed in the labyrinth seal 150 may adopt any channel formed through a seal body 151, and any labyrinth channel structure which is already known or will be known in the art may be used as apparent to those of ordinary skill in the art.

In the annealing apparatus 100 for a float glass according to the exemplary embodiment, the labyrinth seal 150 further includes a collecting nozzle 160 for collecting sulfurous acid gas which may leak through an opening of the sidewall 134 of the lehr housing 130, by forcing the sulfurous acid gas to leak slower or to stop by means of the channel 152 of the labyrinth seal 150 so that the collected sulfurous acid gas is stored in a separate storage (not shown). The collecting nozzle 160 may be installed together with a stopper (not shown) which communicates with the channel 152 of the labyrinth seal 150 and is selectively opened or closed, or the collecting nozzle 160 may connect with the storage through a separate path (not shown). Though only one side of the lehr housing 130 is shown in FIG. 2, the labyrinth seals 150 are installed at both ends of the lehr roller 132, as apparent to those of ordinary skill in the art. Therefore, the labyrinth seal 150 has a connection channel 153 which communicates the collecting nozzle 160 with the channel 152 across the seal body 151.

Hereinafter, an annealing method for a float glass according to an exemplary embodiment will be described.

First, the float glass ribbon G molded in the float bath 110 is moved to the lehr housing 130 to which the lehr rollers 132 are installed. In this process, sulfurous acid gas is supplied through the sulfurous acid gas supply member 140 installed to the lower portion of the lehr housing 130. The sulfurous acid gas reduces the friction between the bottom of the float glass ribbon G and the lehr rollers 132 and reduces the defects that are creating at the surface of the float glass ribbon G.

After that, the sulfurous acid gas supplied into the lehr housing 130 may discharge through a gap between the lehr rollers 132 and the sidewall 134 of the lehr housing 130. However, the labyrinth seals 150 installed at the outer peripheral surface of the lehr rollers 132 seal the gap and prevent the sulfurous acid gas from freely discharging.

In addition, the sulfurous acid gas sealed by the labyrinth seal 150 and leaking through the channel 152 of the seal body 151 may be collected through the collecting nozzle 160 and carried to a storage (not shown).

According to a modified embodiment, the labyrinth seal 150 may also be installed between the lift-out roller 122 installed to the dross box 120 and the outer wall of the dross box, as apparent to those of ordinary skill in the art.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An annealing apparatus for a float glass, which continuously anneals a glass ribbon molded in a float bath, the annealing apparatus comprising:
   a lehr housing which comprises an inlet and an outlet for the glass ribbon;
   a plurality of lehr rolls rotatably installed to both side walls of the lehr housing in a width direction, wherein each of the lehr rolls has a rotary shaft, two ends of which outwardly protrude in a predetermined length through the side walls; and
   labyrinth seals installed around the two ends of the rotary shaft and outside of the sidewalls to prevent sulfurous acid gas supplied into the lehr housing from discharging out.

2. The annealing apparatus for a float glass according to claim 1, wherein each of the labyrinth seals includes a collecting nozzle for collecting sulfurous acid gas discharged through the corresponding labyrinth seal.

\* \* \* \* \*